United States Patent [19]
True

[11] 3,730,992
[45] May 1, 1973

[54] LIGHT VALVE PROJECTOR WITH IMPROVED IMAGE DETAIL AND BRIGHTNESS

[75] Inventor: Thomas T. True, Camillus, N.Y.

[73] Assignee: General Electric Corporation, Syracuse, N.Y.

[22] Filed: Dec. 17, 1970

[21] Appl. No.: 99,058

[52] U.S. Cl...............................178/5.4 BD, 350/161
[51] Int. Cl...............................G02f 1/34, H04n 9/12
[58] Field of Search.................178/5.4 BD; 350/161, 350/162

[56] References Cited

UNITED STATES PATENTS

| | | | |
|---|---|---|---|
| 3,585,283 | 6/1971 | Graser | 178/5.4 BD |
| 3,502,800 | 3/1970 | Slavik | 178/5.4 SD |

*Primary Examiner*—Robert L. Griffin
*Assistant Examiner*—John C. Martin
*Attorney*—Marvin Snyder, W. Joseph Shanley, Frank L. Neuhauser, Oscar B. Waddell and Joseph B. Forman

[57] ABSTRACT

Vestigial filtering of each of the modulated red and blue electrical carriers in a light valve projector reduces light energy of the particular wavelength diffracted by optical diffraction gratings resulting from one electrical sideband and blocked by Schlieren optics output bars, and increases light energy of the same wavelength diffracted by optical diffraction gratings resulting from the other electrical sideband and passed through the Schlieren optics output slots. The red signal filter attenuates lower sideband energy and transmits upper sideband energy, and the blue signal filter attenuates a portion of upper sideband energy and transmits lower sideband energy. A delay line in the green video circuitry equalizes time delay introduced by the filters.

17 Claims, 9 Drawing Figures

INVENTOR:
THOMAS T. TRUE,
BY Marvin Snyder
HIS ATTORNEY.

INVENTOR:
THOMAS T. TRUE,

BY Marvin Snyder
HIS ATTORNEY.

INVENTOR:
THOMAS T. TRUE,

BY Marvin Snyder
HIS ATTORNEY.

LIGHT VALVE PROJECTOR WITH IMPROVED IMAGE DETAIL AND BRIGHTNESS

INTRODUCTION

This invention relates to light valves for optically projecting, in color, images generated electronically on a light controlling layer, and more particularly to a method and apparatus for increasing brightness of images thus projected.

One form of light valve suitable for optical projection of electronically generated images onto a remote display surface comprises an evacuated enclosure containing an electron gun in predetermined alignment with a transparent disk. The disk is rotated through a reservoir of light modulating fluid to deposit a continuously-replenished layer of fluid on the disk surface. An electron beam, generated by the electron gun, is directed through electrostatic beam deflecting and focusing means and is scanned across a portion of the light modulating fluid layer so as to selectively deform the layer. The fluid deformations thus formed constitute optical diffraction gratings which, in conjunction with a Schlieren optical system, selectively control passage of light from a light source through the disk and through an output window in the enclosure envelope in order to create visible images at the remote display surface on which the light impinges.

In particular, diffraction gratings are formed by directing the electron beam onto the fluid layer and horizontally deflecting the beam across the surface of the layer in successive, substantially parallel paths. By velocity modulating the beam with signals corresponding to two primary colors, typically red and blue, horizontal deflection speed along these paths is varied in a periodic manner at a frequency considerably greater than frequency of occurrence of each scan line or parallel path, producing alterations in electrical charges deposited on the fluid layer by the beam when moving along these paths. Concentrations of electrical charge along these paths are attracted to the transparent disk, which is electrically conductive and maintained positive with respect to the electron beam source, to form valleys in the fluid layer substantially orthogonal to the direction of the scanning paths. Hence, as deflection speed of the electron beam across the surface of the fluid layer is varied, depth of the valleys formed is correspondingly changed. As a result, rays of red or blue light impinging on the layer surface are diffracted in planes normal to the longitudinal direction of the valleys in the fluid layer, the diffraction angle being determined by spacing between adjacent valleys. Intensity of light thus diffracted is a function of depth of the valleys. Additionally, horizontally-directed diffraction gratings, corresponding to the green signal, are formed by the horizontal scan lines or parallel paths of the scanning electron beam. While the vertically-directed diffraction gratings are velocity modulated, the horizontally-directed diffraction gratings are wobble modulated; that is, size of the spot formed by the beam is varied in accordance with green signal modulation. Accordingly, rays of green light impinging on the layer surface are diffracted in planes normal to the horizontal scan lines in the fluid layer, the diffraction angle being determined by spacings between adjacent horizontal scan lines. Intensity of the light thus diffracted is a function of depth of the horizontal scan lines.

The electron beam employed in the system is modulated by a plurality of carrier waves of different, substantially constant frequencies, each frequency corresponding to a respective color component of the image to be displayed. Each of the carrier waves, in turn, is amplitude modulated in accordance with an electrical signal corresponding to intensity of the respective color component to form a plurality of superimposed diffraction gratings, each grating having a different line-to-line spacing corresponding to a respective primary color. Depth of the grating lines is thereby varied in accordance with amplitude of the respective color components. A system of this type is described and claimed in W. E. Good et al. U.S. Pat. No. 3,325,592, issued June 13, 1967 and assigned to the instant assignee.

Thus, in order to project three primary colors from a common layer of viscous fluid, the electron beam is made to produce a set of diffraction gratings thereon, each grating corresponding to a respective primary color. The line-to-line spacing of each diffraction grating is different from that of each of the other gratings, thus producing a different angle of light deviation for any given color impinging on the fluid layer. The angle of deviation of any color in the first order diffraction pattern is the angle measured with respect to the undeviated light path, the sine of which is equal to the ratio of the wavelength of light of the given color to the line-to-line spacing of the diffraction grating. The sine of the angle of deviation of light of the given color in the second order diffraction pattern is equal to the ratio of twice the wavelength of light of the given color to the line-to-line spacing of the diffraction grating, and so on. In each order, blue light is deviated the least and red light is deviated the most.

Depth of fluid layer deformation in each diffraction grating is varied in accordance with density of charge deposited by the electron beam so as to produce corresponding variations in intensity of light passed by the diffraction grating. Light emerging from the diffraction gratings is directed into an output mask having apertures of predetermined extent and at predetermined locations in order to pass the selected primary color components of the image to be displayed. Line-to-line spacing of each of the three primary color diffraction gratings is used to determine correct width and location of the corresponding slot in the output mask to pass the respective primary color component when a diffraction grating corresponding to that color has been formed on the fluid layer.

When radiant energy in the form of monochromatic light is passed through a diffraction grating, a series of diffraction spectra, corresponding to the various order diffraction patterns, is produced. Thus, if the primary color components are blue, green and red, the carrier frequency employed to write each grating may be selected so that deviation of blue light by the blue diffraction grating, red light by the red diffraction grating, and green light by the green diffraction grating, are appropriate to locate spatially the first end second order spectra where they may pass through transparent slots in a light output mask. The useful magenta light output comes from the first and second order primary red and blue spectra, and from the first and second order magenta (or red and blue beat frequency) spectra. As described in the aforementioned Good et al. U.S. Pat.

No. 3,325,592, the green diffraction grating is oriented with its lines directed orthogonal to the lines of the red and blue diffraction gratings, so as to simplify the problem of beats in that only the red and blue diffraction gratings have their lines extending along a common direction. Thus, the only beat frequency gratings formed in the light valve result from superimposition of the red and blue gratings.

Optical sidebands are produced by the red and blue diffraction gratings formed by the electron beam velocity modulated in accordance with the respective red and blue video signals, where the respective video signals amplitude modulate respective red and blue video carriers. In each instance, the amplitude modulation produces the carrier plus upper and lower sidebands. As a result, the electron beam is velocity modulated with the upper and lower sidebands of each of the carriers, as well as the carriers themselves. Moreover, the beat frequency grating formed by the velocity-modulated red and blue gratings also produces optical sidebands. Hence magenta light passing through diffraction gratings thus formed produces upper and lower sidebands of each of the red, blue and magenta images, as well as the primary red, blue and magenta images.

Although the useful magenta light output comes from the first and second order primary red and blue spectra, and from the first and second order magenta spectra, the video detail information is contained in the optical sidebands of each of these spectra. Desirably, the optical sidebands should be passed through the Schlieren optics output bar system in order to reproduce accurately the detailed video signal. Thus, it is undesirable for output bars to intercept optical sideband energy since, not only is the blocked optical sideband energy lost insofar as it may contribute to small area highlights, but it may also scatter into small area black regions, thereby degrading small area contrast.

The Schlieren optics output bars have been found to block a portion of each of the sidebands of the red, blue and magenta images. This is because the bars are spaced apart from each other by a finite, predetermined separation, and are of a finite, predetermined width, so as to pass the first and second order primary red, blue and magenta images. Because of these constraints, portions of the upper and lower sidebands of these images are blocked by the bars. Any reduction in this blockage can improve picture detail information and result in improved small area contrast of the image by achieving brighter small area highlights and darker small area blacks. Moreover, any reduction in this blockage also permits more light to reach the remote screen, resulting in a brighter displayed image. The present invention is concerned with reduction in blockage of the upper and lower sidebands in the red, blue and magenta images.

Accordingly, one object of the invention is to provide a color light valve projector having improved picture detail information and improved small area contrast.

Another object is to provide a color light valve projector having a displayed image of increased brightness.

Another object is to provide electrical apparatus for emphasizing upper or lower optical sidebands in light emanating from optical diffraction gratings formed by an amplitude-modulated electrical signal.

Another object is to provide electrical filter apparatus to selectively direct optical energy into the upper or lower sideband of an optical image.

Briefly, in accordance with a preferred embodiment of the invention, an optical projection system including a light valve containing a light modulating medium situated between the input and output masks of a Schlieren optics system employs an amplitude modulator wherein an electrical carrier corresponding to a particular primary color is amplitude modulated by video information for that color. Electrical filtering means couple the output of the amplitude modulator to apparatus for deflecting an electron beam directed onto the surface of the light modulating medium, permitting selective removal of light energy from the image resulting from diffraction of light of the particular primary color by diffraction gratings formed by impingement of the electron beam on the light modulating medium when the deflection velocity of the electron beam has been modulated in accordance with amplitude of the modulated carrier. The electrical filtering means reduces energy in the light blocked by the output mask of the Schlieren optics system and diffracted by gratings corresponding to those produced by one of the electrical sidebands of the modulated carrier and increases energy in the light passed by the output mask of the Schlieren optics system and diffracted by gratings corresponding to those produced by the other of the electrical sidebands of the modulated carrier.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
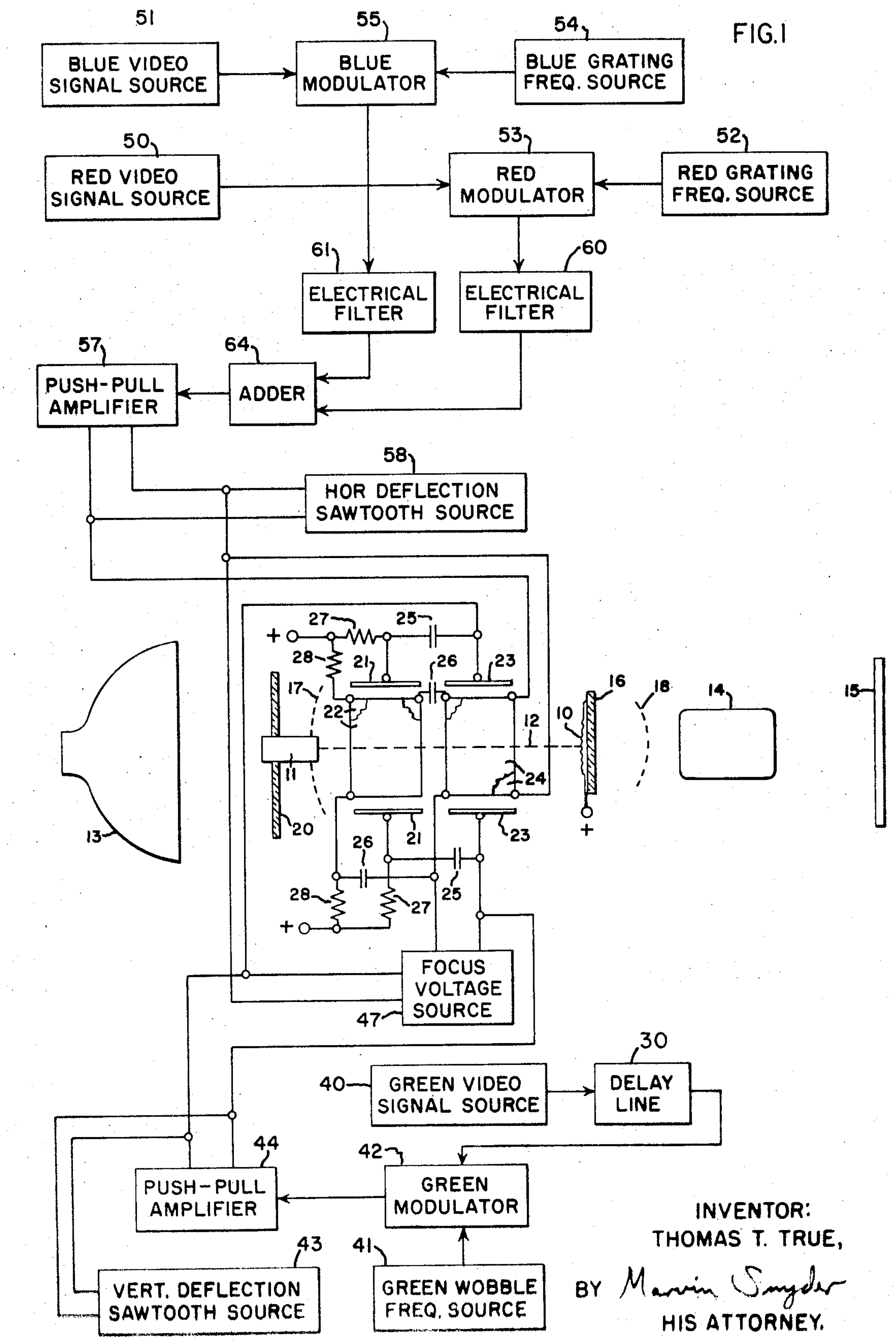
FIG. 1 is a schematic diagram of an optical projection system employing the apparatus of the instant invention.

FIG. 1 illustrates a colored optical image projection system including a light-modulating medium 10, such as a fluid of the type described in H. E. Towlson U.S. Pat. No. 3,385,991, issued May 28, 1968 and assigned to the instant assignee, and an electron beam generating device 11, such as an electron gun, producing an electron beam 12 which impinges on medium 10. Medium 10 is supported on an optically transparent substrate 16. Light from a light source 13 is directed onto light modulating medium 10, and light emergent from medium 10 is focused by a projection lens 14 onto a remote screen 15 on which the projected image is displayed. In order to obtain light of the desired characteristics, additional optical elements such as lenticular lenses are employed in the system but, for ease in understanding the invention, are omitted from the description herein. Examples of suitable optical elements for use with the present invention are shown and described in W. E. Good et al. U.S. Pat. No. 3,290,436, issued Dec. 6, 1966, nd W. E. Good et al. U.S. Pat. No. 3,330,908, issued July 11, 1967, both of which patents are assigned to the instant assignee.

An apertured light mask 17 is situated on the light input side of light modulating medium 10, while a second apertured light mask 18 is situated on the light output side of light modulating medium 10. Output light mask 18 is comprised of a geometrical configuration of the type illustrated in FIG. 2 and described in detail infra; that is, a plurality of vertically-extending parallel slots and opaque bars are situated in the central portion of each mask, and a plurality of horizontally-extending parallel slots and opaque bars are situated on either side of the central portion of each mask. Input light mask 17 is of geometrical configuration similar to that of output light mask 18, except that the input mask has slots where the output mask has bars, and vice versa. A generally circular color filter 20, situated between light source 13 and input mask 17, is constructed with a vertically oriented central portion, corresponding to the central portion of masks 17 and 18, adapted to pass substantially only the red and blue, or magenta, components of white light, and with segments on either side of the central portion, corresponding to the regions of masks 17 and 18 containing the horizontal slots and bars, adapted to pass only the green component of white light.

Light-modulating medium 10, with its surface adjacent substrate 16 maintained at positive potential so as to act as an accelerating electrode for electrons emitted by electron gun 11, is deformable by impingement of electron beam 12 thereon. The electron beam is controlled by a pair of vertical deflection plates 21, a pair of horizontal deflection plates 22, a pair of vertical focus and deflection electrodes 23, and a pair of horizontal focus and deflection electrodes 24. Each of vertical focus and deflection electrodes 23 is coupled to one of vertical deflection plates 21 through a blocking capacitor 25, respectively, while each of horizontal deflection plates 22 is coupled to one of horizontal focus and deflection electrodes 24 through a blocking capacitor 26, respectively. These capacitors permit AC voltage on the focus and deflection electrodes to be applied to the deflection plates, while preventing any DC voltage on the focus and deflection electrodes, required in order to maintain the electron beam at a small cross section (a fraction of a mil in diameter), from reaching the deflection plates. Each of deflection plates 21 and 22 is resistively coupled to a positive potential through a resistance 27 and 28, respectively, so as to prevent any charge build up on deflection plates 21 and 22 which would interfere with their performing an electron beam deflection function.

Electron beam deflection voltages, which produce the information necessary for electron beam 12 to deform medium 10 in a manner enabling display of the desired image on remote screen 15, are derived from a received video signal by a red video signal source 50, a blue video signal source 51, and a green video signal source 40. The instantaneous amplitude of each of these signal sources corresponds, respectively, to intensity of an element of the respective color in a television image to be projected on screen 15. In addition, signals of constant frequency and constant amplitude are generated by each of a red grating frequency source 52, a blue grating frequency source 54, and a green wobble frequency source 41, and comprise a carrier signal furnished to each of a red amplitude modulator 53, a blue amplitude modulator 55, and a green amplitude modulator 42, respectively. Each of amplitude modulators 53, 55 and 42 is of the type which generates both upper and lower sidebands, as well as the carrier, at its respective output.

Figure 6:
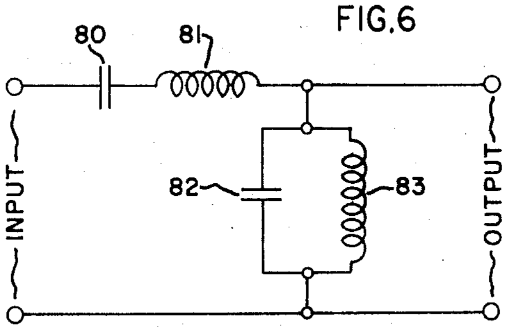
FIG. 6 is a schematic diagram of a typical electrical filter used in the apparatus of FIG. 1.
Figure 5A:
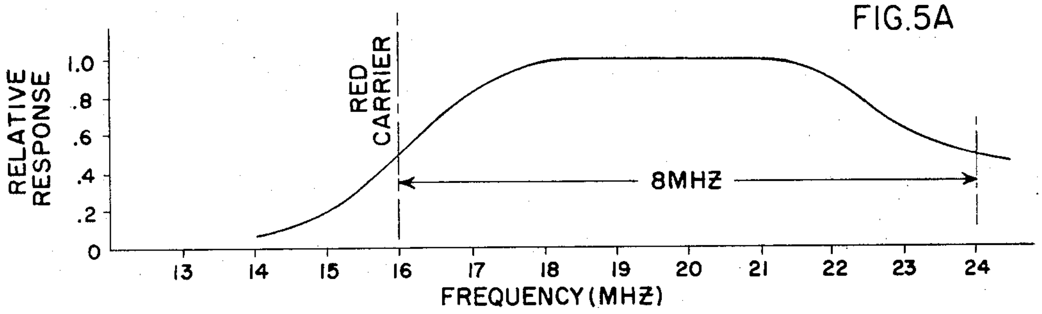
FIGS. 5A and 5B are response curves for the electrical filters employed in the apparatus of FIG. 1.
Figure 5B:
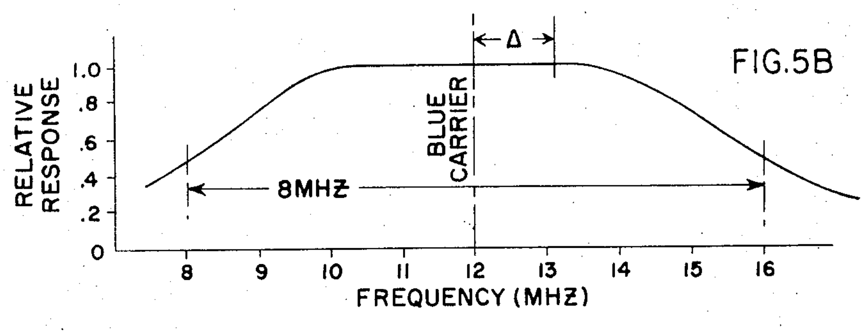

Output signals from red video signal source 50 are furnished to red modulator 53, so as to modulate the red grating signal applied thereto. Similarly, output signals from blue video signal source 51 are furnished to blue modulator 55, so as to modulate the blue grating signal applied thereto. Output signals from green video signal source 40 are furnished through a delay line 30 to green modulator 42, so as to modulate the green grating signal applied thereto. The delay introduced by delay line 30 is approximately 60 nanoseconds in order to compensate for the delay introduced by each of a pair of electrical filters 60 and 61 coupling the outputs of each of red modulator 53 and blue modulator 55, respectively, to respective inputs of a two-input adder circuit 64. The characteristics of electrical filters 60 and 61 are illustrated in FIGS. 5A and 5B, respectively, and the circuitry of each of filters 60 and 61 is schematically illustrated in FIG. 6, all of which are described, infra.

Adder circuit 64 algebraically sums the signals received from electrical filters 60 and 61, and furnishes the resultant signal to push-pull amplifier 57. Output signals of amplifier 57, together with outputs signals produced by a horizontal deflection sawtooth voltage source 58, are applied to horizontal focus and deflection electrodes 24. In similar fashion, output signals of green modulator 42 are furnished to a push-pull amplifier 44, the output of which is coupled to vertical focus and deflection electrodes 23. In addition, a vertical deflection sawtooth voltage source 43 is also coupled to vertical focus and deflection electrodes 23. A focus voltage source 47 furnishes electrical potentials of the proper amplitudes to focus and deflection electrodes 23 and 24 in order to maintain electron beam 12 at the desired focus.

In operation, electron beam 12 is swept, in raster fashion, along the surface of deformable medium 10 by the potentials applied to deflection plates 21 and 22 and focus and deflection electrodes 23 and 24. The beam is swept in a horizontal direction by the voltage produced by horizontal deflection sawtooth voltage source 58 and in a vertical direction by the voltage produced by vertical deflection sawtooth voltage source 43. During horizontal and vertical retrace intervals, the electron beam is blanked by circuitry which, for ease in understanding the invention, is not shown.

Impingement of the electron beam on deformable medium 10 causes formation of a depression in the medium because of the electrical potential thus produced across the medium at the point where the electron beam has struck. As the beam is swept horizontally, the combined signal corresponding to the red video signal amplitude modulated on a red carrier and filtered, plus the blue video signal amplitude modulated on a blue carrier and filtered, is applied to deflection plates 22 and focus and deflection electrodes 24 from push-pull amplifier 57. These signals are thereby superimposed upon the horizontal deflection voltage, causing horizontal movement of the electron beam to occur at a controllably varying speed. This type of electron beam deflection is known in the art as velocity modulation.

As a result of this velocity modulation, horizontal motion of the electron beam exhibits intervals in which motion of the beam is alternately slowed and accelerated. These intervals occur at regular locations along each of the horizontal paths of the beam in accordance with each carrier frequency supplied to push-pull amplifier 57. As the beam is swept horizontally, a narrow channel is formed in deformable medium 10 along the path of the beam, due to electrical charge deposition on the surface of the medium. Depth of the channel depends on speed at which the beam is moved; that is, if the beam is deflected rapidly, less charge is deposited along its path than if the beam is deflected more slowly. As amount of charge per unit length along the path of the beam increases, depth of the channel thus formed also increases, and vice versa.

During each of the slowed motion portions of the electron beam horizontal motion intervals, sufficient additional charge is deposited on the surface of deformable medium 10 to cause formation of a depression along the channel being formed by the beam. Accordingly, for each carrier frequency produced by a grating frequency source and furnished to push-pull amplifier 57, a plurality of equally-spaced, vertical columns of depressions in deformable medium 10 is produced. These columns thus form valleys in the deformable medium so as to comprise vertical optical diffraction gratings. Intensity of light diffracted by the vertical optical diffration gratings is controlled by depth of the depressions along the horizontal channels in deformable medium 10 which, in turn, is determined by amplitude of the carrier or grating frequency producing the depressions; that is, by amplitude modulating the video signal for a particular color upon the grating frequency or carrier frequency for that particular color, speed of horizontal motion throughout each interval along the horizontal paths of the electron beam is controlled. Since depth of deformation is determinative of intensity of light passing therethrough, the red and blue video signal sources thus control amplitude of the red and blue light, respectively, passing through deformable medium 10.

The green component of light passed by deformable medium 10 is determined by the signal from green video signal source 40 which, in modulator 42, amplitude modulates the carrier produced by green wobble frequency source 41. The output signal of modulator 42 exhibits a constant frequency equal to the carrier frequency of the green wobble frequency source, which produces the green diffraction grating, and an amplitude varying inversely with amplitude of green video signal source 40. The output signal of modulator 42, amplified by push-pull amplifier 44, is superimposed on the vertical deflection voltage produced by vertical deflection sawtooth source 43, causing the electron beam to "wobble," or move vertically for controllably variable distances at a periodic rate. A uniform spreading or smearing of the charge deposited by the electron beam thus occurs in a direction transverse to the horizontal scanning direction of the beam. With larger amplitude green video signals, carrier amplitude is reduced and more charge is concentrated along the center of the horizontal scanning direction, resulting in a deeper channel in light modulating medium 10 along that part of the horizontal scanning line. Accordingly, the natural horizontal diffraction grating formed by channels produced by the focused electron beam sweeping in a horizontal direction represents maximum green modulation, or light field, and the defocusing during lower amplitude green video signals tends to spread or smear the grating by widening the horizontal channels. For good green dark field, the horizontal diffraction grating is virtually wiped out. Maximum amplitude of wobble is limited to the value required for optimum dark field.

White light from light source 13 is projected onto color filter plate 20 which passes only magenta light through its central zone and only green light through sectorial zones at either side of its central zone. The light thus segregated by the color filter plate is passed through input mask 17 and focused on the raster area of deformable medium 10 by lenses (not shown).

During presence of uniform charge on its surface, oil film 10 is smooth. However, due to the action of electron beam 12 as it scans over the surface of deformable medium 10, electrical charge is deposited in the previously described manner in order to form three optical diffraction gratings. Two of the diffraction gratings thus formed are vertically disposed and serve to diffract the red and blue portions of the light spectrum, respectively. The third grating is horizontally disposed and serves to diffract the green portion of the light spectrum. The three superimposed diffraction gratings thus define the image to be projected on remote display surface 15.

Light from the diffraction gratings on deformable medium 10 is passed through output light mask 18 which, as previously noted, is made complementary in configuration to input mask 17. In absence of gratings on deformable medium 10, the slots of input mask 17 are imaged onto the bars of output mask 18. When diffraction gratings are formed on deformable medium 10, light is deviated by the gratings so as to pass through the slots of output mask 18. Light emerging from the slots of output mask 18 is projected by projection lens 14 onto remote display surface 15, forming an image corresponding to the electrical signals producing deformations in deformable medium 10. That is, since the slots and bars of masks 17 and 18 are oriented with respect to each other in a predetermined manner, and since light of various diffraction orders is passed in accordance with diffraction grating geometry, controlled portions of the optical spectrum pass through the grating and mask arrangement to facilitate their optical assembly by projection lens 14 onto display screen 15.

Heretofore, the signal which velocity modulates the electron beam has comprised the sum of the amplitude-modulated signals produced by modulators 53 and 55. However, the process of amplitude modulation results in a composite signal comprising the carrier plus upper and lower sidebands. In an electrical signal, the modulation information is contained entirely within the upper and lower sidebands, while the signal power is contained in both carrier and sidebands. If diffraction gratings are formed by velocity modulating the electron beam with double sideband, amplitude-modulated video signals, then, when light of the appropriate color is directed through the grating, it is diffracted in accordance with the carrier frequency and the upper and lower sideband frequencies. As a result, information for a complete optical image in that color, as determined by the modulated video signal, is directed onto output mask 18. While the zero order of this image is blocked by the bars of mask 18, it is desirable to pass the entire first and second order images through the mask in order to produce the image efficiently for display. Accordingly, since the red and blue images are formed by velocity modulation, it is desirable to pass the entire first and second order red and blue images through mask 18. However, diffraction results in a greater angle of deviation for red light than for blue light. Thus, mask 18 must block first and second order blue light where only red light is required, and block first and second order red light when only blue light is required. These constraints, together with the interleaved nature of the bars in the Schlieren optics system, lead to asymmetrical placement of the first order red and blue light in the slots of output mask 18. Consequently, the output mask acts as a spatial filter which blocks the lower sideband content (i.e. lower diffraction angle) of the red light and the upper sideband content (i.e. higher diffraction angle) of the blue light.

Figure 2:
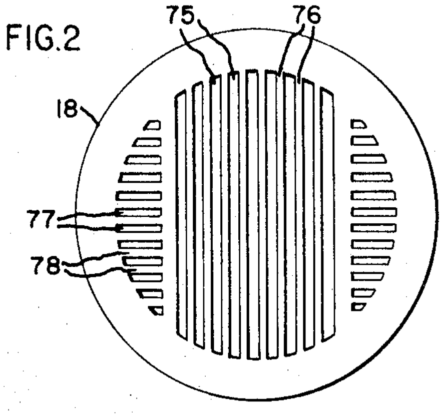
FIG. 2 is a plan view of a typical light output mask employed in the projection system of FIG. 1.

FIG. 2 illustrates an example of output mask 18, showing the centrally-located vertical slots 75 separated by vertical bars 76, and the sectorially-located horizontal slots 77 separated by horizontal bars 78. Input mask 17 resembles output mask 18, with the exception that the slots and bars are interchanged. Accordingly, in the input mask, regions 75 would comprise vertical bars and regions 76 would comprise vertical slots, while regions 77 would comprise horizontal bars and regions 78 would comprise horizontal slots.

Figure 3A:
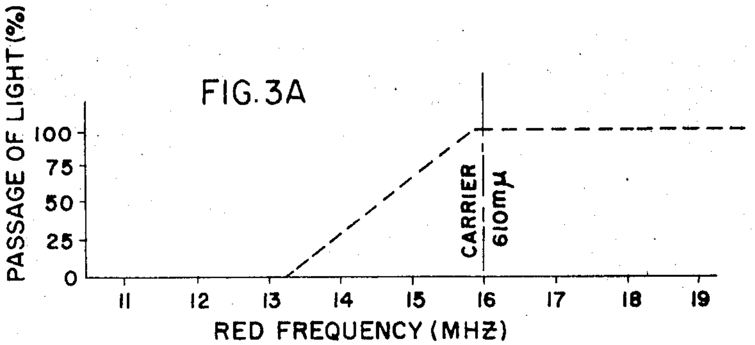
FIGS. 3A and 3B are graphical illustrations of the filtering effect of the light output mask in the system of FIG. 1 on light passing through optical diffraction gratings produced by velocity modulating an electron beam over a range of frequencies, for each of two respective electrical carrier frequencies.
Figure 3B:
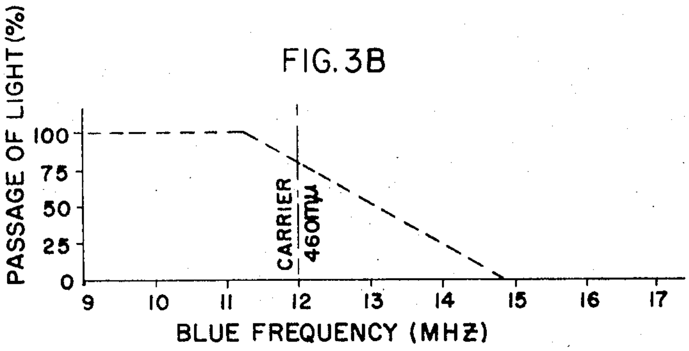

FIG. 3A illustrates the filtering action of the output mask in relation to first order light diffracted by the red diffraction grating formed on deformable medium 10 in the system illustrated in FIG. 1, while FIG. 3B illustrates the filtering action of the output mask in relation to first order light diffracted by the blue diffraction grating formed on deformable medium 10. Typically, as shown in FIG. 3A, the electrical carrier frequency of the red component is 16 MHz, producing red light centered about 610 millimicrons in wavelength while, as shown in FIG. 3B, the electrical carrier frequency of the blue component is 12 MHz, producing blue light centered about 460 millimicrons in wavelength. The electrical carrier frequency of the green component typically is 48 MHz. From FIG. 3A, it can be seen that the lower optical sideband, or light diffracted by gratings formed by the electron beam in response to the lower sideband of the 16 MHz electrical carrier, is increasingly attenuated with decreasing frequency until, at just above 13 MHz, this light is entirely blocked by output mask 18 in the system of FIG. 1. The upper optical sideband, or light diffracted by gratings formed by the electron beam in response to the upper sideband of the 16 MHz electrical carrier, however, is not blocked by the output mask even if the upper sideband goes as high in frequency as 19 MHz.

From FIG. 3B, it can be seen that the electron beam, in response to the 12 MHz electrical carrier itself, produces a grating which diffracts light that is approximately 20 percent blocked by output mask 18, while gratings resulting from the upper sideband of the 12 MHz electrical carrier modulating the electron beam diffract light (i.e., the upper optical sideband) which is increasingly attenuated with increasing frequency until, at just below 15 MHz, light diffracted by gratings resulting from the upper sideband of the 12 MHz carrier is entirely blocked by the output mask. Light diffracted by gratings resulting from the lower sideband of the 12 MHz carrier modulating the electron beam (i.e., the lower optical sideband), however, is decreasingly attenuated until, at lower sideband frequencies just above 11 MHz, light diffracted by the resulting diffraction gratings is no longer blocked by output mask 18, nor is this light blocked if lower sideband frequency decreases even to as low a frequency as 9 MHz.

Figure 4A:
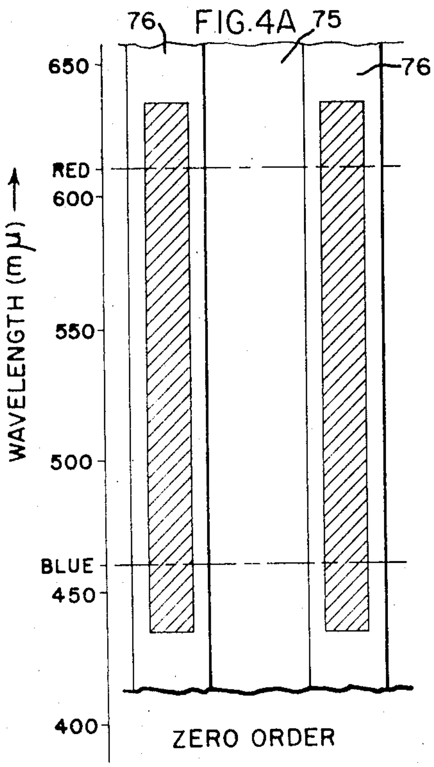
FIGS. 4A and 4B are illustrations of the effect of the bars in the light output mask in the apparatus of FIG. 1 upon zero order and first order light, respectively, over a range of optical wavelengths, useful in understanding the curves of FIGS. 3A and 3B.
Figure 4B:
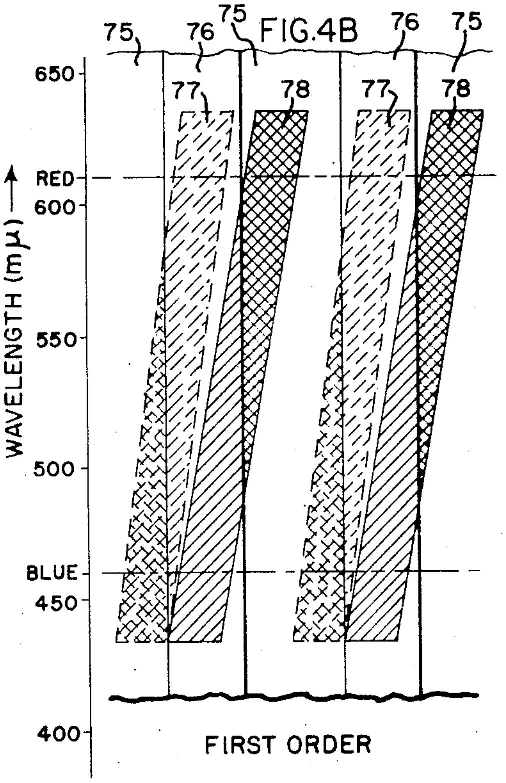

FIG. 4A illustrates the action of output mask 18, shown in FIG. 2, in response to zero order light produced by diffraction gratings formed by the modulated 12 MHz and 16 MHz carriers, while FIG. 4B illustrates the action of the output mask in response to first order light diffracted by these gratings. Both FIGS. 4A and 4B depict the condition in which the system light source is imaged on every bar of the output mask. In FIG. 4A, the crosshatched regions represent zero order light of different wavelengths, designated along the vertical scale, falling on bars 76 of the output mask. It is evident that, regardless of wavelength, the zero order light falls wholly upon the bars of the output mask, and none of the zero order light passes through slots 75 between bars 76 so that none of this light is ultimately projected onto remote viewing screen 15 shown in FIG. 1.

In FIG. 4B, the crosshatched regions represent first order light of different wavelengths, designated along the vertical scale, with the singly-crosshatched portions falling on bars 76 so as to be blocked thereby, and with the doubly-crosshatched regions passing through slots 75 on either side of bars 76 so as to contribute to the image projected onto the remote viewing screen. Region 77, bounded by dotted lines, represents light diffracted by gratings formed by the modulated 12 MHz carrier while region 78, bounded by solid lines, represents light diffracted by gratings formed by the modulated 16 MHz carrier. It can be seen that, at the red wavelength of 610 millimicrons, the entire spectrum of first order light resulting only from the modulated 16 MHz carrier passes through slots 75 so as to contribute to the synthesis of the displayed image, while at the blue wavelength of 460 millimicrons, approximately 80 percent of the entire spectrum of first order light resulting only from the modulated 12 MHz carrier passes through slots 75 so as to contribute to the synthesis of the displayed image.

Sidebands of light regions 77 and 78 fall on either side of these regions for any given wavelength of light. Although the sideband regions for each of light regions 77 and 78 are not shown, the upper sidebands would fall to the right, and the lower sidebands to the left, of the light regions formed by the respective carriers. This is because, for any given wavelength of light, a different diffraction angle is associated with each different frequency producing the diffraction grating. Therefore, light diffracted by the lower sideband of the 16 MHz carrier at the red (i.e. 610 millimicrons) wavelength impinges on bars 76 and is blocked, while light diffracted by the upper sideband of the 16 MHz carrier at the red wavelength passes through transparent slots 75. Similarly, light diffracted by the upper sideband of the 12 MHz carrier at the blue (i.e. 460 millimicrons) wavelength impinges on bars 76 and is blocked, while light diffracted by the lower sideband of the 12 MHz carrier at the blue wavelength passes through transparent slots 75. Accordingly, it can be seen that the lower sideband of red light and upper sideband of blue light are both blocked by presence of bars 76.

For red light, there exists an additional factor tending to diminish light intensity when the 16 MHz carrier has been double-sideband modulated and coupled to horizontal deflection electrodes 22 and 24, shown in FIG. 1, through wideband circuitry. This factor is due to an asymmetrical influence in the process of deforming the light-modulating fluid with an electron beam, as well as the fluid response itself, both of which lead to unequal optical sideband energy.

The velocity modulation process, wherein the carrier is added to the sawtooth voltage deflection waveforms, leads to the following differential charge versus carrier frequency relationship:

$$q \alpha f,$$

where $q$ is differential charge extant on the deformable medium and $f$ is electrical carrier frequency.

Fluid deformation sensitivity changes with spatial frequency of the grating which, in turn, is related to electrical carrier frequency such that $$d \alpha (q/f^2)$$

where $d$ is groove depth. Thus, the conflicting influence of the velocity modulation process and the fluid writing response is an overall $$d \alpha (1/f) \ldots$$

There is, therefore, a natural tendency for the fluid to deemphasize the upper (higher diffraction angle) sideband, and to emphasize the lower (smaller diffraction angle) sideband. This is detrimental to the red detail and small area contrast, since the bars of the output mask in the Schlieren optics system block the lower diffraction angle sideband of red and hence both upper and lower sidebands of red are attenuated.

The problems of sideband attenuation discussed in conjunction with FIGS. 3A and 3B, and FIGS. 4A and 4B are minimized by employment of electrical filters 60 and 61 in the system illustrated in FIG. 1, having the filter characteristics illustrated in FIGS. 5A and 5B respectively. in FIG. 5A, the 16 MHz red electrical carrier is shown positioned at the 50 percent response level on the filter characteristic which has odd symmetry in a frequency band surrounding the carrier and has an 8 MHz bandwidth as measured at the 6db or 50 percent response level and a 6 MHz bandwidth as measured at the 3db or 70.7 percent response level. Thus, vestigial filter 60 in the apparatus of FIG. 1 exhibits odd symmetry in the frequency band surrounding the carrier, so that upper sideband of the red signal is emphasized while lower sideband is deemphasized. Consequently, at higher video or modulation frequencies, the output signal of filter 60 is a single sideband signal while, at lower video modulation frequencies, a vestige of the lower sideband is also contained in the output signal of filter 60. Because the carrier frequency is at the 50 percent level, and because of the odd symmetry surrounding the carrier, the transition from low video frequency double sideband to high video frequency single sideband is smooth and is compensated (i.e. the percent modulation remains essentially constant as video frequency changes).

In FIG. 5B, the 12 MHz blue electrical carrier signal is shown positioned at the 100 percent response level on the filter characteristic which has an 8 MHz bandwidth as measured at the 6db or 50 percent response level and a 6 MHz bandwidth as measured at the 3db or 70.7 percent response level. While theoretical considerations would lead to placement of the carrier at the 50 percent response level on the high frequency side of the filter characteristic, such arrangement has been found to produce excessive preshoots and smear in the transient response of the blue image. Situating the blue electrical carrier at the 100 percent response level has been found empirically to product better blue transient response as well as better magenta transient response.

While filter 61 of the system shown in FIG. 1 is preferably designed for the 12 MHz blue carrier to fall where indicated, the filter will also produce satisfactory results if it is designed for the 12 MHz blue carrier to fall within the band designated Δ on the 100 percent response level of the filter. One reason that the carrier is not positioned at the 50 percent response level on the high frequency side of the filter characteristic is that the combined effect of the fluid deformation characteristics and light output mask filtering tends to emphasize the lower sideband of the video spectrum; hence, lowering the carrier to the 50 percent response level excessively emphasizes the lower sidebands in relation to the carrier, leading to poor transient response. Thus, while filter 61 is technically not a vestigial filter in and of itself, it has the effect of a vestigial filter on the diffraction gratings formed by the electron beam (i.e., the effect is as though a vestige of the upper sidebands is velocity modulating the electron beam), and the transition from high video frequency double sideband to low video frequency single sideband is also smooth and compensated.

The electrical energy spectrum shift introduced by filters 60 and 61 results in a corresponding optical energy shift at output mask 18 in the apparatus shown in FIG. 1. Optical energy deviated by the diffraction gratings produced by electrical sideband energy is shifted away from light blocked by opaque bars 76 of light output mask 18 and into light passed through slots 75 of the output mask. In the observed image, the net result is brighter small area highlights, and darker small area blacks, both contributing to improved small area contrast and resolution.

FIG. 6 is a schematic diagram of circuitry which may be employed in each of electrical filters 60 and 61. The circuit comprises a series-connected capacitance 80 and inductance 81, and a parallel-connected capacitance 82 and inductance 83. The sizes of components 80, 81, 82 and 83 may be readily derived from constant-*k* tables such as those shown on page 7–6 of *Reference Data for Radio Engineers*, fifth edition, Howard W. Sams & Co., Inc., using a 6 MHz bandwidth and a center frequency selected to locate the carrier frequency at the desired response level.

In the apparatus of FIG. 1, electrical filters 60 and 61 introduce approximately equal envelope delays because bandwidths (and attenuation characteristics) are similar. In order to match time delay of the green video circuitry to that of the red and blue video circuitry, delay line 30 is employed in the green video circuitry in lieu of a filter. This is because the green signal processing circuitry exhibits high horizontal resolution capability, so that it would be undesirable to narrow the bandwidth of the output signal produced by green modulator 42.

By employing electrical filters 60 and 61 to achieve vestigial filtering, better resolution and small area contrast are achieved in the red, blue and magenta portions of the displayed image, and color fringing in fine detail red and blue is reduced. One reason that magenta performance also is improved by the invention is that the upper sideband of the 12 MHz signal and the lower sideband of the 16 MHz signal no longer overlap each other, thereby reducing zero beats and fringes in magenta detail. Alternatively, single sideband amplitude modulation may be employed directly, so that the upper sideband of the 12 MHz signal and the lower sideband of the 16 MHz signal are not present, their energies being transferred to the lower sideband of the 12 MHz signal and the upper sideband of the 16 MHz signal, respectively.

The foregoing describes a color light valve projector having improved picture detail information and improved small area contrast, as well as a displayed image of increased brightness. Electrical filter apparatus selectively directs substantially monochromatic optical energy into the upper or lower sideband of the red or blue optical image, respectively. As a result, magenta performance is also improved in that the upper sideband of the modulated blue electrical carrier and the lower sideband of the modulated red electrical carrier do not overlap each other so that zero beats and fringes in magenta detail are avoided.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. In an optical projection system wherein an image to be displayed in color is formed by impingement of an electron beam on a light-modulating medium, said electron beam being deflected over the surface of said medium in one direction in accordance with each of first and second signals so as to form optical diffraction gratings on said medium representing two primary colors respectively, said medium being situated between the input mask and output mask of a Schlieren optics system, said optical projection system including a source of light comprised of said primary colors directed through transparent regions of said input mask onto said diffraction gratings and thence onto said output mask, said system including a first circuit producing said first signal amplitude-modulated on a carrier of frequency representing one of said primary colors, and a second circuit producing the second signal amplitude-modulated on a carrier of frequency representing the other of said primary colors, the improvement comprising:

electron beam deflecting means for influencing the path of said electron beam;

first electrical bandpass filter means coupling the output of said first circuit to said electron beam deflecting means; and second electrical bandpass filter means coupling the output of said second circuit to said electron beam deflecting means.

2. The apparatus of claim 1 wherein said first electrical bandpass filter means passes the upper sideband of the modulated signal produced by said first circuit and said second electrical bandpass filter means passes the lower sideband of the modulated signal produced by said second circuit.

3. The apparatus of claim 2 wherein said first electrical bandpass filter means blocks substantially the entire lower sideband of the modulated signal produced by said first circuit and said second electrical bandpass filter means blocks a portion of the upper sideband of the modulated signal produced by said second circuit.

4. In an optical projection system wherein an image to be displayed in color is formed by impingement of an electron beam on a light-modulating medium, said electron beam being deflected over the surface of said medium in one direction in accordance with each of first and second signals and in another, substantially orthogonal direction in accordance with a third signal so as to form optical diffraction gratings on said medium representing three primary colors, said medium being situated between the input mask and output mask of a Schlieren optics system, said optical projection system including a source of light comprised of said primary colors directed through transparent regions of said input mask onto said diffraction gratings and thence onto said output mask, said system including a first circuit producing said first signal amplitude-modulated on a carrier of frequency representing one of said primary colors, a second circuit producing said second signal amplitude-modulated on a carrier of frequency representing a second of said primary colors, and a third circuit producing said third signal amplitude-modulated on a carrier of frequency representing the third primary color, the improvement comprising:

electron beam deflecting means for influencing the path of said electron beam;

first electrical bandpass filter means coupling the output of said first circuit to said electron beam deflecting means;

second electrical bandpass filter means coupling the output of said second circuit to said electron beam deflecting means;

said first and second electrical bandpass filter means introducing substantially equal delays into the output signals of said first and second circuits, respectively; and delay means coupling the output of said third circuit to said electron beam deflecting means, said delay means introducing a time delay into the output signal of said third circuit which is substantially equivalent to the time delay introduced by each of said first and second electrical bandpass filter means.

5. The apparatus of claim 4 wherein said electron beam deflecting means comprises first beam deflection means for deflecting said electron beam in said one direction and second beam deflection means for deflecting said electron beam in said substantially orthogonal direction, said first and second electrical filter means being coupled to said first beam deflection means, and said delay means being coupled to said second beam deflection means.

6. The apparatus of claim 5 wherein said first beam deflection means comprises a first pair of substantially parallel electrostatic deflection plates, and said second beam deflection means comprises a second pair of substantially parallel electrostatic deflection plates, said first pair of deflection plates being oriented substantially orthogonal to said second pair of deflection plates.

7. In an optical projection system wherein an image to be displayed in color is formed by impingement of an electron beam on a light-modulating medium, said electron beam being deflected over the surface of said medium in one direction in accordance with each of first and second signals so as to form optical diffraction gratings on said medium representing two primary colors respectively, said medium being situated between the input mask and output mask of a Schlieren optics system, said optical projection system including a source of light comprised of said primary colors directed through transparent regions of said input mask onto said diffraction gratings and thence onto said output mask, the improvement comprising:

electron beam deflecting means for influencing the path of said electron beam;

first circuit means coupled to said electron beam deflecting means and amplitude modulating said first signal onto a first carrier of frequency representing one of said primary colors so as to produce a signal consisting essentially of said first carrier frequency and the upper sideband; and second circuit means coupled to said electron beam deflecting means and amplitude modulating said second signal onto a carrier of frequency representing the other of said primary colors so as to produce a signal consisting essentially of said second carrier frequency and the lower sideband.

8. In an optical projection system wherein an image to be displayed is formed by impingement of an electron beam on a light-modulating medium, said electron beam being deflected over the surface of said medium in accordance with a signal so as to form optical diffraction gratings on said medium representing the image to be displayed, said medium being situated between the input mask and output mask of a Schlieren optics system, said optical projection system including a source of light directed through transparent regions of said input mask onto said diffraction gratings and thence onto said output mask, said system including circuit means for double sideband amplitude modulating said signal onto a carrier, the improvement comprising:

electron beam deflecting means for influencing the path of said electron beam; and electrical bandpass filter means coupling the output of said circuit means to said electron beam deflecting means, said electrical bandpass filter means restricting energy in one of the sidebands produced by said circuit means and passing energy in the other sideband produced by said circuit means.

9. In an optical projection system wherein an image to be displayed is formed by impingement of an electron beam on a light-modulating medium, said electron beam being deflected over the surface of said medium in accordance with a signal so as to form optical diffraction gratings on said medium representing the image to be displayed, said medium being situated between the input mask and output mask of a Schlieren optics system, said optical projection system including a source of light directed through transparent regions of said input mask onto said diffraction gratings and thence onto said output mask, the improvement comprising:

electron beam deflecting means for influencing the path of said electron beam; and circuit means coupled to said electron beam deflecting means and amplitude modulating said signal onto a carrier so as to produce an electron beam modulating signal consisting essentially of said carrier frequency and a sideband.

10. A method of forming diffraction gratings on a medium for controllably deviating radiant energy onto opaque or transparent regions of a light mask in accordance with a modulated electrical signal such that the grating resulting from one of two electrical sidebands of the modulated electrical signal is capable of diffracting a reduced amount of radiant energy through said transparent regions with respect to the amount of radiant energy diffracted through said transparent regions by the grating resulting from the other of the electrical sidebands, said method comprising:

filtering the modulated electrical signal so as to block at least a portion of said one electrical sideband; and deflecting an electron beam over the surface of said medium in accordance with the filtered, modulated electrical signal so as to form said diffraction gratings on said medium.

11. The method of claim 10 wherein said electrical signal comprises an electrical carrier amplitude-modulated with video information.

12. The method of claim 11 wherein deflection velocity of said electron beam is modulated in accordance with said filtered, modulated electrical signal.

13. A method of forming, on a light-modulating medium, optical diffraction gratings for controllably deviating light of two different primary colors onto opaque or transparent regions of a light mask in accordance with each of a pair of modulated electrical signals respectively such that, for each modulated electrical signal, the grating resulting from one of two electrical sidebands is capable of diffracting an increased amount of light energy of the respective primary color through said transparent regions and the grating resulting from the other of the electrical sidebands is capable of diffracting a reduced amount of light energy of said respective primary color through said transparent regions, said method comprising:

filtering each of said modulated electrical signals so as to pass said one electrical sideband of each of said modulated video signals and block at least a portion of said other electrical sideband of each of said modulated electrical signals; and deflecting an electron beam over the surface of said medium in accordance with the sum of each of the filtered, modulated electrical signals so as to form optical diffraction gratings on said medium capable of deviating light of said two primary colors onto predetermined regions of said light mask.

14. For use in an optical projection system wherein an image source is situated between the input mask and output mask of a Schlieren optics system, said optical projection system including a source of light to be directed through transparent regions of said input mask onto said image source and thence onto selected regions of said output mask, said output mask controllably passing light on a surface on which a replica of said image source is displayed, apparatus for forming said image source on a light-modulating medium capable of being situated between said input mask and output mask, said apparatus comprising:

means for generating an electron beam directed toward the surface of said light-modulating medium;

electron beam deflecting means for deflecting said electron beam over the surface of said medium in accordance with at least one modulated electrical signal so as to form optical diffraction gratings on said medium representing said image source, said modulated electrical signal having a pair of sidebands; and electrical filtering means coupled to said deflecting means, said electrical filtering means receiving said modulated electrical signal and restricting energy in one of said sidebands while passing energy in the other of said sidebands such that said other of the sidebands primarily controls formation of said optical diffraction gratings and said one of the sidebands exerts little influence on formation of said optical diffraction gratings.

15. For use in an optical projection system wherein an image source is situated between the input mask and output mask of a Schlieren optics system, said optical projection system including a source of light to be directed through transparent regions of said input mask onto said image source and thence onto selected regions of said output mask, said output mask controllably passing light onto a surface on which a replica of said image source is displayed, apparatus for forming said image source on a light-modulating medium capable of being situated between said input mask and output mask, said apparatus comprising:

means for generating an electron beam directed toward the surface of said light-modulating medium;

means for deflecting said electron beam over the surface of said medium in accordance with a pair of modulated electrical signals so as to form optical diffraction gratings on said medium representing said image source, each of said modulated electrical signals having a pair of sidebands;

algebraic adder means coupled to said means for deflecting said electron beam; and first and second electrical filtering means coupled to said adder means, each said electrical filtering means respectively receiving a separate one of said modulated electrical signals and, for each respective modulated electrical signal, restricting energy in one of said sidebands while passing energy in the other of said sidebands such that said other of the sidebands of each respective modulated electrical signal primarily controls formation of said optical diffraction gratings and said one of the sidebands of each respective modulated electrical signal exerts little influence on formation of said optical diffraction gratings.

16. The apparatus of claim 15 wherein said means for deflecting said electron beam comprises means for deflecting said electron beam in each of at least two different directions in accordance with each of said modulated electrical signals, respectively.

17. In an optical projection system wherein an image to be displayed in color is formed by impingement of an electron beam on a light-modulating medium, said electron beam being deflected over the surface of said medium in one direction in accordance with a signal so as to form an optical diffraction grating on said medium representing a first primary color, said medium being situated between the input mask and output mask of a Schlieren optics system, said optical projection system including a source of light comprised of said first primary color and at least a second primary color being directed through transparent regions of said input mask onto said diffraction grating and thence onto said output mask, said system including a circuit producing said signal amplitude-modulated on a carrier of frequency representing said first primary color, the improvement comprising:

electron beam deflecting means for influencing the path of said electron beam; and electrical bandpass filter means coupling the output of said circuit to said electron beam deflecting means, said electrical bandpass filter means passing the lower sideband of the modulated signal produced by said circuit and blocking a portion of the upper sideband of the modulated signal produced by said circuit.

* * * * *